United States Patent [19]
Lehmann et al.

[11] Patent Number: 5,360,130
[45] Date of Patent: Nov. 1, 1994

[54] JUNCTION BOX

[75] Inventors: Martin Lehmann, Auburndale; John Davies, Lakeland; Helmut Fochler, deceased, late of Haines City, all of Fla., by Helga S. Fochler, legal representative

[73] Assignee: Cantex Inc., Mineral Wells, Tex.

[21] Appl. No.: 221,536

[22] Filed: Mar. 31, 1994

Related U.S. Application Data

[63] Continuation of Ser. No. 37,912, Mar. 26, 1993, abandoned.

[51] Int. Cl.⁵ .............................................. H07N 3/08
[52] U.S. Cl. ...................................... 220/3.8; 220/354; 220/356; 220/306; 220/307
[58] Field of Search ................ 220/3.8, 354, 356, 306, 220/307

[56] References Cited

U.S. PATENT DOCUMENTS

| | | | |
|---|---|---|---|
| 3,107,838 | 10/1963 | Brys et al. | 220/356 |
| 3,430,799 | 3/1969 | Maier | 220/327 |
| 4,620,061 | 10/1986 | Appleton | 220/3.8 |
| 4,896,784 | 1/1990 | Heath | 220/3.8 |
| 5,165,563 | 11/1992 | McKendry | 220/356 |

*Primary Examiner*—Joseph Man-Fu Moy
*Attorney, Agent, or Firm*—Kane, Dalsimer, Sullivan, Kurucz, Levy, Eisele and Richard

[57] ABSTRACT

A junction box is provided having a housing and a cover. The housing includes a housing wall extending upwardly from a base about the periphery thereof. A lip extends outwardly about the top edge of the housing wall and engages in a snap fit in a channel in a wall of the cover. A pair of inner walls which depend from the cover top prevent the housing from inadvertently being disengaged.

13 Claims, 3 Drawing Sheets

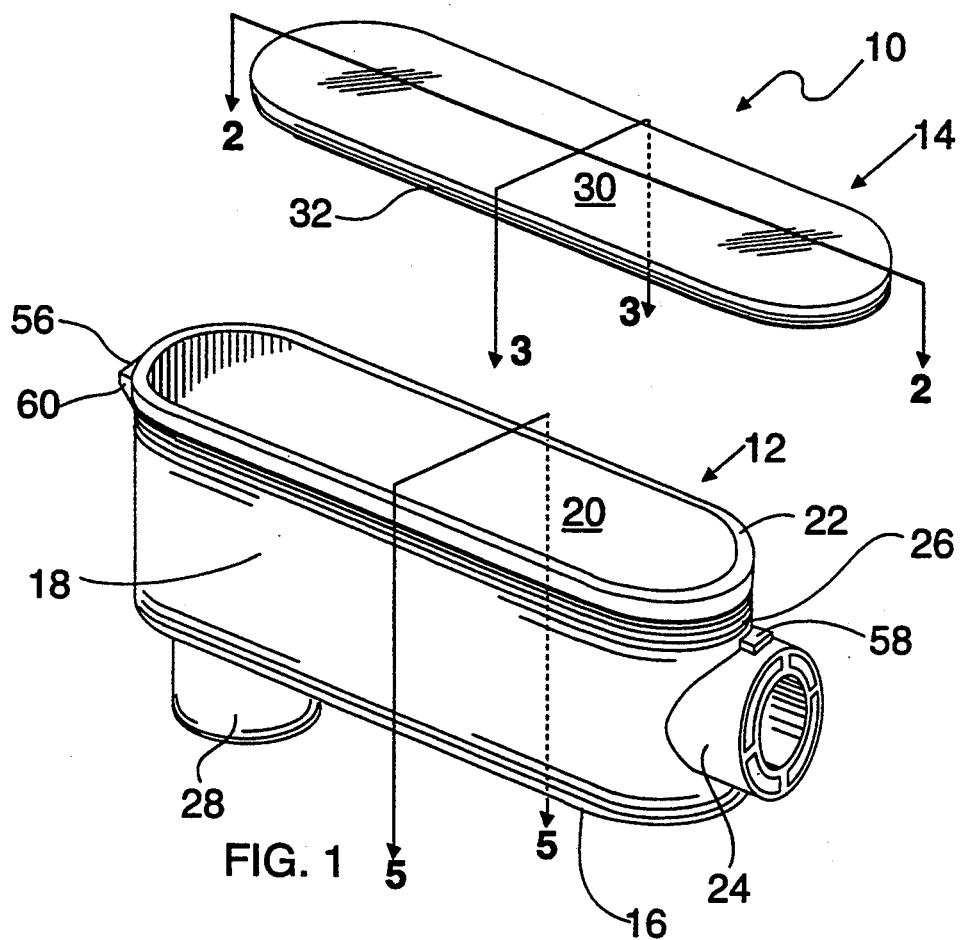
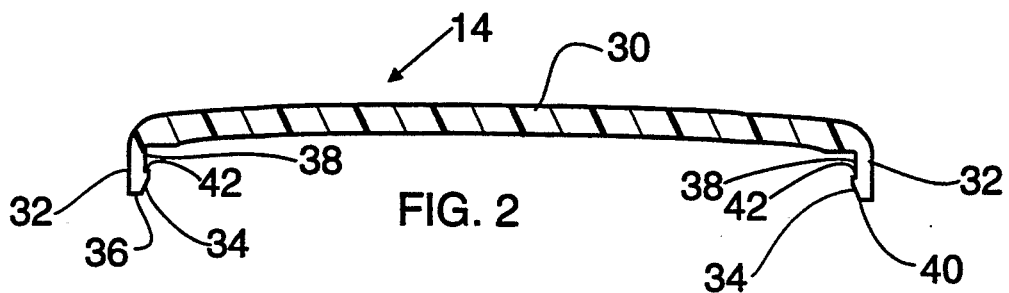
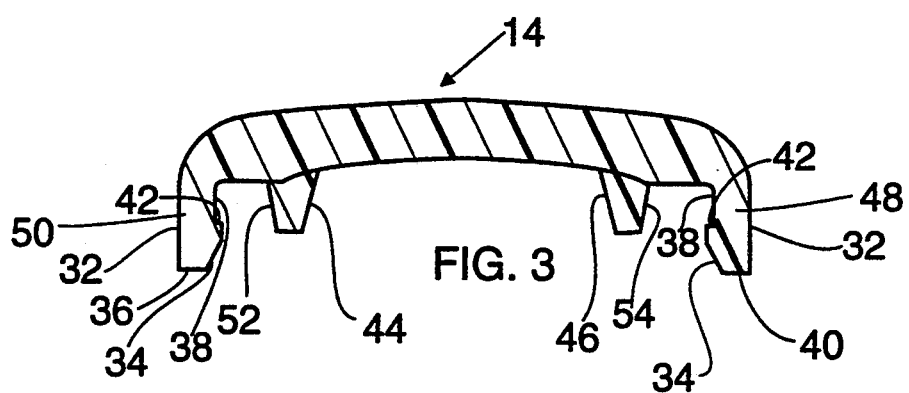

JUNCTION BOX

This application is a continuation of application No. 08/037,912, filed Mar. 26, 1992, now abandoned.

BACKGROUND OF THE INVENTION

The present invention relates to a junction box for interconnecting electrical conduits and in particular to a gasketless, snap locking junction box.

In U.S. Pat. No. 4,896,784 a PVC junction box for interconnecting PVC electrical conduit is disclosed. The junction box disclosed in this reference has advantages over conventional junction boxes in that the use of gaskets and fasteners is avoided. However, in place of fasteners, the disclosed junction box relies on a series of latch members and latch sockets to secure the housing and cover to one another. These latch elements must be precisely molded and positioned to work properly particularly under extremes of temperature. Further, the cover must be secured to the housing with sufficient strength to guard against tampering and inadvertent dislodgement.

SUMMARY OF THE INVENTION

In view of the above, it is a principal object of the present invention to provide an improved junction box wherein the housing and cover may conveniently and reliably be interlocked to one another without requiring the use of fasteners.

Another object is to provide such a junction box wherein the housing and cover fit in a water resistant manner obviating the need for gaskets.

A further object is to provide such a junction box which may be economically produced.

The above and other beneficial objects and advantages are attained with the present invention by providing a junction box comprising a housing and a cover. The housing includes a housing wall extending upwardly from a base about the periphery thereof. A lip extends outwardly about the top edge of the housing wall. The cover includes a cover wall extending downwardly from a top about the periphery thereof. The cover wall has an inner configuration closely conforming to the housing member wall exterior configuration. A channel having a height and a depth sufficient to define an indent to accommodate the housing member lip in a locking fit extends about the cover wall and a cam surface extends between the cover wall bottom end and a lower end of the channel. The cam surface tapers inwardly from a lower end configured to accommodate the housing member lip to an upper end defining an entranceway to the channel. At least one internal wall member extends downwardly from the cover top and inwardly from the cover wall by a distance slightly greater than a thickness of the housing wall.

BRIEF DESCRIPTION OF THE DRAWINGS

In the accompanying drawings:

FIG. 1 is an exploded perspective view of a junction box in accordance with the present invention;

FIG. 2 is a sectional view taken along reference lines 2—2 of the junction box cover of FIG. 1;

FIG. 3 is a sectional view taken along reference lines 3—3 of the junction box cover of FIG. 1;

DETAILED DESCRIPTION OF THE PREFERRED EMBODIMENT

Figure 4:
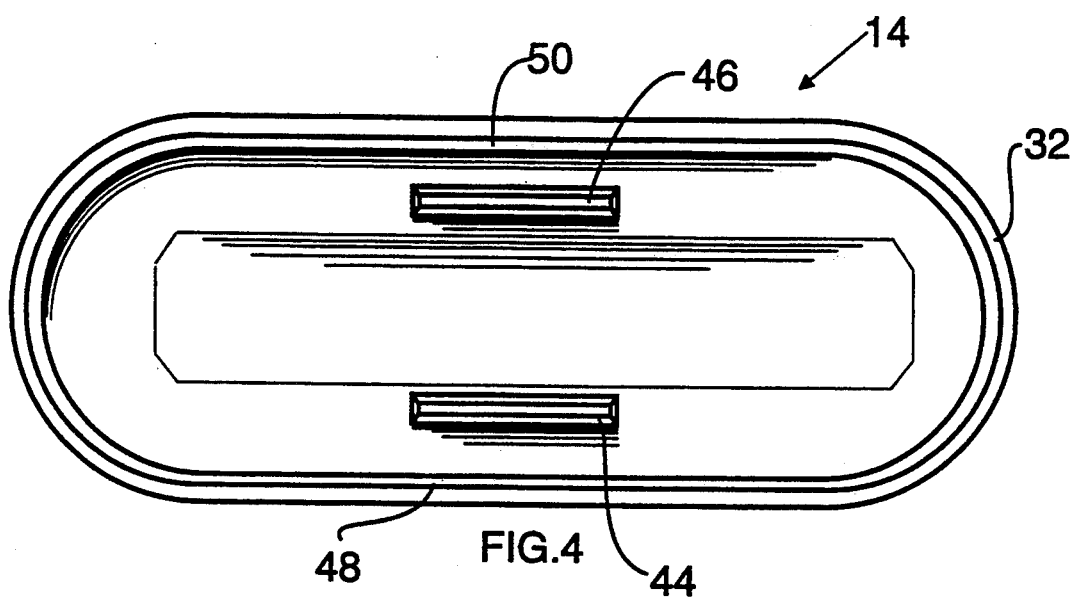
FIG. 4 is a plan view of the underside of the junction box cover of FIG. 1.
Figure 5:
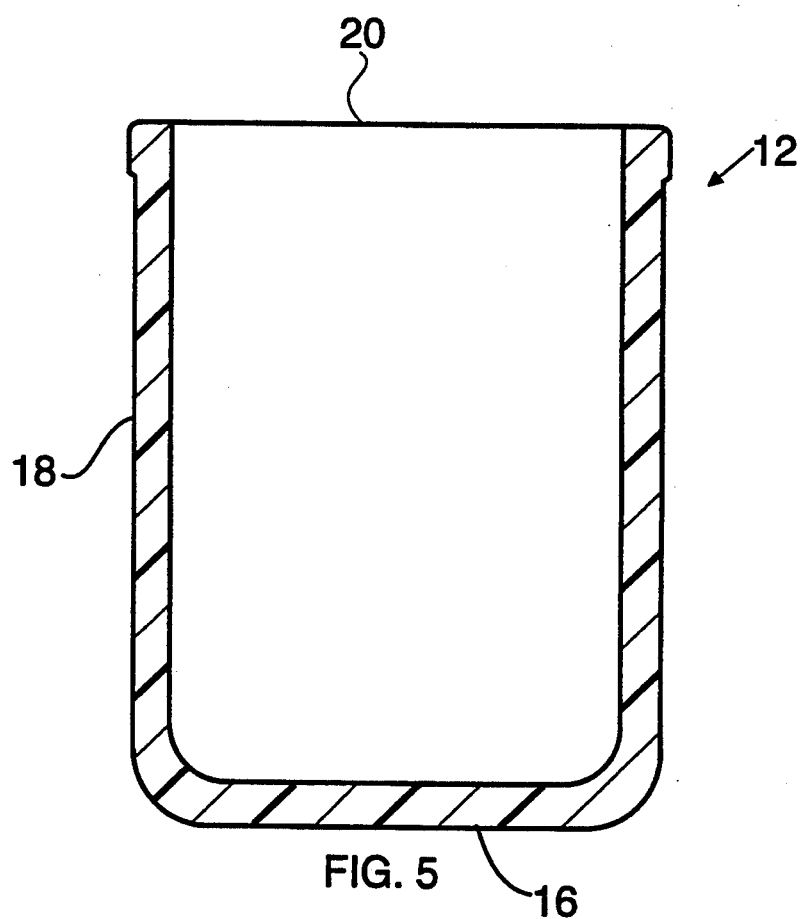
FIG. 5 is a sectional view taken along reference lines 5—5 of the junction box housing of FIG. 1.
Figure 6:
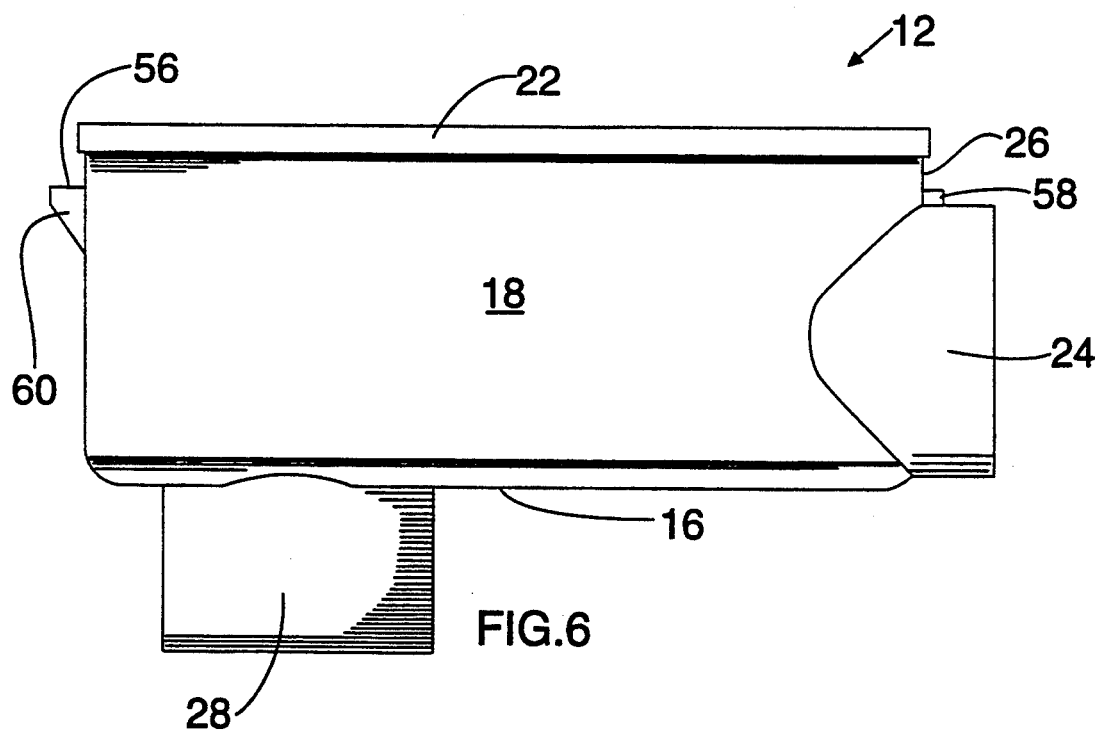
FIG. 6 is a sectional view taken along reference lines 6—6 of the junction box housing of FIG. 1; and, FIG. 7 is an end elevational view of the junction box housing of FIG. 1.
Figure 7:
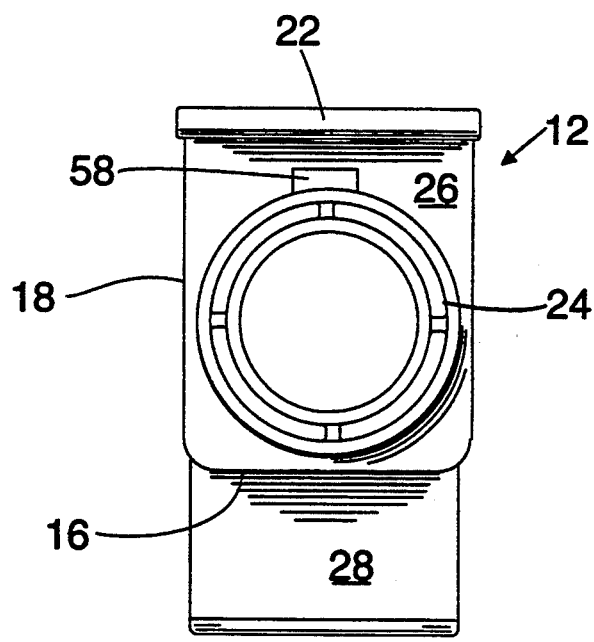

Reference is now made to the drawings and to FIG. 1 in particular wherein a junction box 10 in accordance with the present invention is depicted comprising a housing 12 and cover 14. The housing 12 consists of a generally oval tub shaped member having a base 16, sidewalls 18 and an open top end 20. An outward lip 22 extends continuously about the top edge of the sidewalls as shown. A conduit fitting 24 extends forwardly from a front end 26 of the housing and a similar conduit fitting 28 extends downwardly from the bottom 16 of the housing.

The cover 14 has a generally oval configuration and includes a top 30 from which a cover wall 32 depends downwardly. The cover and housing are dimensioned so as to enable the cover wall 32 to skirt closely about the housing wall 18. To this end, the cover wall 32 is provided with a cam surface 34 which tapers inwardly and upwardly from the free bottom end 36 of the cover wall and extends continuously about the entire cover wall. The cam surface leads to a channel extending about the cover wall. The height and depth of the channel are such as to receive the lip 22 of the housing in a snug fit. In this regard, it should be noted that the lead edge 40 of the cam surface 34 is spaced outwardly of the base of channel 38 to permit the cover to be easily placed over the housing. By bearing down on the cover the housing lip 22 is then urged to snap into the channel 38 where it is locked in position by virtue of the undercutting of surface 42.

The cover and housing are preferably formed of a plastic material such as PVC. Since such materials are somewhat flexible the cover may readily be snapped into position on the housing. By the same token, however, there is the danger of the cover and housing becoming disattached by virtue of the housing sides being squeezed sufficiently to disengage the lip 22 from channel 38. To prevent such disengagement, internal walls 44, 46 are provided spaced inwardly from the straight side sections 48, 50 of cover wall 32. The outer surfaces 52, 54 of internal walls 44, 46 taper upwardly and outwardly to facilitate snapping the cover in position on the housing and also to urge the housing wall lip 22 into the cover channel 38. The internal walls 44, 46 further serve to lock lip 22 in channel 38 and prevent lip 22 from disengaging from channel 38 if the sides of the housing are squeezed. This also permits lip 22 to fit tightly in channel 38 avoiding the need for a separate gasket member.

It should be noted that the internal walls 44, 46 are only placed adjacent the straight side walls 48, 50 of the cover and not at the rounded ends of the cover. Thus, the cover may be removed from the housing by prying the ends of the cover off the housing. To facilitate such prying surfaces 56 and 58 are provided at the ends of the housing. Prying surface 56 is provided on an outwardly extending flange 60. Prying surface 58 is provided on top of fitting 24. The prying surfaces are generally flat and are disposed below the bottom edge of lip 22 to permit a coin or flathead screwdriver to be positioned between the prying surface and lower edge of the cover wall so that by a twisting action the cover may be pried off the housing.

Thus, in accordance with the above the aforementioned objects and advantages are effectively attained. It should be apparent that modifications may be made from the preferred embodiment of this invention without departing from the scope of the following claims.

Having thus described the invention, what is claimed is:

1. A junction box comprising:
    a housing member having a base and a housing wall extending upwardly from said base about the periphery thereof, said housing wall terminating at an open top end of said housing member;
    a cover having a top and a cover wall extending downwardly from said top about the periphery thereof, said cover wall terminating at an open bottom end of said cover member, said cover wall having an inner configuration closely conforming to said housing member wall exterior configuration;
    a lip disposed about said housing wall adjacent said housing member top end and extending outwardly and downwardly therefrom;

2. The junction box in accordance with claim 1 further comprising a cam surface extending between said cover open bottom end and a lower end of said channel, said cam surface tapering inwardly from a lower end configured to accommodate said housing member lip to an upper end defining an entranceway to said channel.

3. The junction box in accordance with claim 1 wherein first said internal wall tapers outwardly and upwardly toward said cover top.

4. The junction box in accordance with claim 2 wherein said housing member and cover are both generally oval having opposed straight sides and rounded ends and further comprising a second internal wall member, said internal wall members being parallel to said cover straight sides and extending downwardly from said cover top and inwardly from said cover wall straight sides by a distance slightly greater than a thickness of said housing wall straight sides, said housing wall straight sides adjacent said open top being captured between said cover wall straight sides and said internal walls, with said pry surface being peripherally spaced from said second internal wall member along said lip.

5. The junction box in accordance with claim 4 wherein each of said internal walls tapers outwardly and upwardly toward said cover top.

6. The junction box in accordance with claim 2 wherein said lip extends continuously about said housing member and said channel and said cam surface extend continuously about said cover.

7. The junction box in accordance with claim 1 further comprising at least one conduit fitting extending through said housing member.

8. The junction box in accordance with claim 4 further comprising at least one conduit fitting extending through a rounded end of said housing member, said pry support surface being affixed to said conduit fitting.

9. In combination a cover and a junction box of the type comprising a housing having a housing wall with a lip extending about a top end of said housing wall to define a lip periphery including a first lip periphery portion and a second lip periphery portion spaced from said first periphery lip portion, said cover having a top defining a top periphery and a cover wall extending downwardly from said top about said top periphery, said cover wall terminating at an open bottom end of said cover, said cover wall having an inner configuration closely conforming to said housing wall exterior configuration; wherein said cover further comprises
    a channel extending about said cover disposed between said open bottom end and said top, said channel having a height and a depth sufficient to define an indent to accommodate said housing lip in a locking fit; and
    a first internal wall member extending downwardly from said cover top and inwardly from said cover wall by a distance slightly greater than a thickness of said housing wall, said channel and said first internal wall cooperating to prevent said housing member from disengaging from said cover, said first internal wall being disposed opposite only a first portion of said lip periphery when said cover is interlocked with said housing; and
    wherein said housing member further comprises
    a pry surface provided on said housing member wall exterior extending outwardly under a second portion of said lip periphery, said second portion being peripherally spaced from said first portion and spaced from said cover to permit a prying tool to be inserted adjacent to said second portion between said prying surface and said open bottom to separate said cover from said housing member.

10. The combination of claim 9 wherein said cover further comprises a cam surface extending between said cover open bottom end and a lower end of said channel, said cam surface tapering inwardly from a lower end configured to accommodate said housing lip to an upper end defining an entranceway to said channel.

11. The junction box in accordance with claim 9 is wherein said internal wall tapers outwardly and upwardly toward said cover top.

12. The combination in accordance with claim 9 wherein said cover is generally oval having opposed straight sides and rounded ends and further comprising a second internal wall member, said internal wall members being parallel to said cover straight sides extending downwardly from said cover top and inwardly from said cover wall straight sides by a distance slightly greater than a thickness of said housing wall straight sides, said housing wall straight sides adjacent said open top being captured between said cover wall straight sides and said internal walls.

13. The junction box in accordance with claim 12 wherein each of said internal walls tapers outwardly and upwardly toward said cover top.

* * * * *